United States Patent [19]

Amini et al.

[11] Patent Number: 5,265,211
[45] Date of Patent: Nov. 23, 1993

[54] ARBITRATION CONTROL LOGIC FOR COMPUTER SYSTEM HAVING DUAL BUS ARCHITECTURE

[75] Inventors: Nader Amini; Bechara F. Boury, both of Boca Raton; Richard L. Horne, Boynton Beach; Terence J. Lohman, Boca Raton, all of Fla.

[73] Assignee: International Business Machines Corporation, Armonk, N.Y.

[21] Appl. No.: 816,116

[22] Filed: Jan. 2, 1992

[51] Int. Cl.$^5$ ............................................. G06F 13/362
[52] U.S. Cl. ................................. 395/325; 364/DIG. 1; 364/240.2; 364/242.92
[58] Field of Search ........................ 395/325, 275, 725

[56] References Cited

U.S. PATENT DOCUMENTS

| 4,703,420 | 10/1987 | Irwin | 395/800 |
|---|---|---|---|
| 4,766,536 | 8/1988 | Wilson, Jr. et al. | 395/325 |
| 4,982,321 | 1/1991 | Pantry et al. | 395/325 |
| 5,003,463 | 3/1991 | Coyle et al. | 395/275 |
| 5,003,465 | 3/1991 | Chisholm et al. | 395/275 |

Primary Examiner—Debra A. Chun
Attorney, Agent, or Firm—Stephen A. Terrile; John A. Kastelic

[57] ABSTRACT

A computer system is provided comprising system memory and a memory controller for controlling access to system memory, a central processing unit electrically connected with the memory controller, and a bus interface unit electrically connected to the memory controller by a system bus and electrically connected to a plurality of input/output devices by an input/output bus. The bus interface unit is able to sense when said one of said input/output devices has completed a read or write operation over said input/output bus, and includes a buffer circuit wherein read and write data transferred between the system bus and the input/output bus via the bus interface unit is temporarily stored during the transfer. Arbitration control logic resides in said bus interface unit and interacts with a central arbitration controller which resides on the system bus. The central arbitration controller responds to the arbitration control logic to simultaneously perform (i) arbitration cycles wherein the central arbitration controller arbitrates between the plurality of input/output devices and the central processing unit to determine which of the input/output devices or the central processing unit should be granted control of the input/output bus and (ii) grant cycles wherein the central arbitration controller grants control of the input/output bus and extends control of the system bus to one of the input/output devices or the central processing unit.

26 Claims, 5 Drawing Sheets

ARBITRATION CONTROL LOGIC FOR COMPUTER SYSTEM HAVING DUAL BUS ARCHITECTURE

RELATED APPLICATIONS

The following U.S. patent applications are incorporated herein by reference as if they had been fully set out:

Application Ser. No. 815,992 Filed Jan. 2, 1992 Entitled "BUS CONTROL LOGIC FOR COMPUTER SYSTEM HAVING DUAL BUS ARCHITECTURE"

Application Ser. No. 816,184 Filed Jan. 2, 1992 Entitled "PARITY ERROR DETECTION AND RECOVERY"

Application Ser. No. 816,204 Filed Jan. 2, 1992 Entitled "CACHE SNOOPING AND DATA INVALIDATION TECHNIQUE"

Application Ser. No. 816,203 Filed Jan. 2, 1992 Entitled "BUS INTERFACE LOGIC FOR COMPUTER SYSTEM HAVING DUAL BUS ARCHITECTURE"

Application Ser. No. 816,691 Filed Jan. 2, 1992 Entitled "BIDIRECTIONAL DATA STORAGE FACILITY FOR BUS INTERFACE UNIT"

Application Ser. No. 816,693 Filed Jan. 2, 1992 Entitled "BUS INTERFACE FOR CONTROLLING SPEED OF BUS OPERATION"

Application Ser. No. 816,698 Filed Jan. 2, 1992 Entitled "METHOD AND APPARATUS FOR DETERMINING ADDRESS LOCATION AT BUS TO BUS INTERFACE"

BACKGROUND OF THE INVENTION

The present invention relates to bus to bus interfaces in computer systems, and more particularly to improved arbitration control logic and method for arbitrating control of buses in a dual bus architecture computer system.

Generally in computer systems and especially in personal computer systems, data is transferred between various system devices such as a central processing unit (CPU), memory devices, and direct memory access (DMA) controllers. In addition, data is transferred between expansion elements such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus controllers (i.e., devices which can control the computer system) and bus slaves (i.e., elements which are controlled by bus controllers).

Personal computer systems having more than one bus are known. Typically, a local bus is provided over which the CPU communicates with cache memory or a memory controller, and a system I/O bus is provided over which system bus devices such as the DMA controller, or the I/O devices, communicate with the system memory via the memory controller. The system I/O bus comprises a system bus and an I/O bus connected by a bus interface unit. The I/O devices communicate with one another over the I/O bus. The I/O devices are also typically required to communicate with system bus devices such as system memory. Such communications must travel over both the I/O bus and the system bus through the bus interface unit.

Often in computer systems it is necessary for expansion devices to arbitrate for ownership of the I/O bus of the computer system; i.e., to decide which expansion device may transfer information via the I/O bus. It is known to provide an arbiter which determines which expansion device may transfer information via the I/O bus, i.e., which allocates the bus. Such an arbiter serves as a central arbitration control point (CACP) via which all arbitration for the I/O bus occurs.

The I/O bus operates in time divided units which are called bus cycles. Bus cycles of the I/O bus are divided into arbitration cycles and grant cycles. During arbitration cycles, expansion devices compete for ownership of the I/O bus. During grant cycles, a device which has won ownership of the bus, transfers information.

I/O devices may only initiate memory read or write cycles to system memory during an arbiter grant mode. Such a method of serial arbitration imposes performance limitations on dual bus architecture computer systems due to the time required to separately perform arbitration and the memory read or write cycles which may occur only during an arbiter grant mode.

It is an object of the present invention, then, to provide an arbitration system and method for a dual bus computer architecture system which simultaneously permits (i) arbitration between a CPU and I/O devices contending for control of I/O bus and (ii) completion of an I/O controller device read or write operation to system memory or a CPU write operation to expansion memory on an I/O slave device.

SUMMARY OF THE INVENTION

According to the present invention, arbitration control logic and a method of arbitration are provided for a computer having a dual bus architecture. The arbitration control logic is implemented by algorithms which are built into hardware in a bus interface unit which resides intermediate a system bus and an input/output bus in the computer. The arbitration control logic improves the performance of the dual bus architecture computer by permitting simultaneous arbitration cycles by a central arbitration controller point and memory read and write cycles by a CPU or I/O devices.

The arbitration control logic operates under three prescribed conditions. Under the first condition, an I/O device desires to write data to system memory. After completion of an arbitration cycle, the central arbitration control point grants control of the I/O bus (and the system bus via the bus interface unit) to the I/O device. The I/O device initiates one or more write cycles to system memory which are temporarily stored in buffers in the bus interface unit, before being written to system memory. Since the I/O device may relinquish control of the I/O bus at this time, the bus interface unit may contain buffered data which still needs to be written from the buffers out to system memory.

Although the I/O device may relinquish control of the I/O bus, it must remain in control of the system bus (via the bus interface unit) to complete the write transfer of the buffered data over the system bus to system memory. The arbitration control logic in the bus interface unit recognizes this condition and activates a CACP override signal to the CACP requesting that it retain control of the system bus. Accordingly, the central arbitration control point begins a new the arbitration cycle simultaneously while the buffered write data from the I/O device is transferred to system memory. Upon completing the buffered write transfers, the CACP override signal is deactivated allowing the CACP to complete arbitration and grant the I/O bus.

The second condition under which the arbitration control logic in the bus interface unit operates occurs when an I/O device desires to read data from system memory. After completion of an arbitration cycle, the central arbitration control point grants control of the I/O bus (and the system bus via the bus interface unit) to the I/O device. The I/O device initiates one or more read cycles to system memory. The buffers in the bus interface unit are continually filled with prefetched data having addresses contiguous to those previously read. Once the I/O device has read the last byte of data from the buffers it may relinquish control of the I/O bus and thus the prefetched data is not needed. Thus, the buffers in the bus interface unit must be reset, effectively removing this unnecessary data.

Although the I/O device may relinquish control of the I/O bus at any time, it must remain in control of the system bus (via the bus interface unit) until the current transfer of data from system memory to the bus interface unit has been completed. The arbitration control logic in the bus interface unit recognizes this condition and activates a CACP override signal to the CACP requesting that it retain control of the system bus until the last prefetch operation is completed and the buffers in the bus interface unit are reset. Accordingly, the central arbitration control point begins a new arbitration cycle on the I/O bus simultaneously while the bus interface unit completes the last prefetch operation from system memory over the system bus and then resets the buffers.

The third condition under which the arbitration control logic in the bus interface unit operates occurs when a system device such as the CPU is in control of the system bus and desires to write data to an I/O device acting as a slave on the I/O bus. After completion of an arbitration cycle, the central arbitration control point grants control of the system bus (and the I/O bus via the bus interface unit) to the system device which initiates its write cycle to the I/O device via the system bus to I/O bus translation logic.

The system bus to I/O bus translation logic provides a buffer wherein data destined to be written from a system device such as the CPU to expansion memory on an I/O slave device is temporarily stored before being written to the I/O slave device. After the last transfer of data is buffered in the translation logic, the system bus is no longer needed. The CPU and the bus interface unit indicate that they are finished with the system bus. At this point, the central arbitration controller may go into arbitration on the I/O bus even though the data buffered in the translation logic must still be written to the I/O device over the I/O bus. This situation is possible because, unlike I/O devices, the CPU may write to an I/O device during either the arbitration or grant modes of the central arbitration controller.

The arbitration control logic in the bus interface unit recognizes this condition and activates a CACP override signal to the CACP requesting that it retain control of the I/O bus until the last byte of buffered data is written to the I/O device. Accordingly, the central arbitration controller conducts the arbitration cycle simultaneously while the data buffered in the translation logic is written to the I/O device.

DETAILED DESCRIPTION OF THE PREFERRED EMBODIMENT

Figure 1:
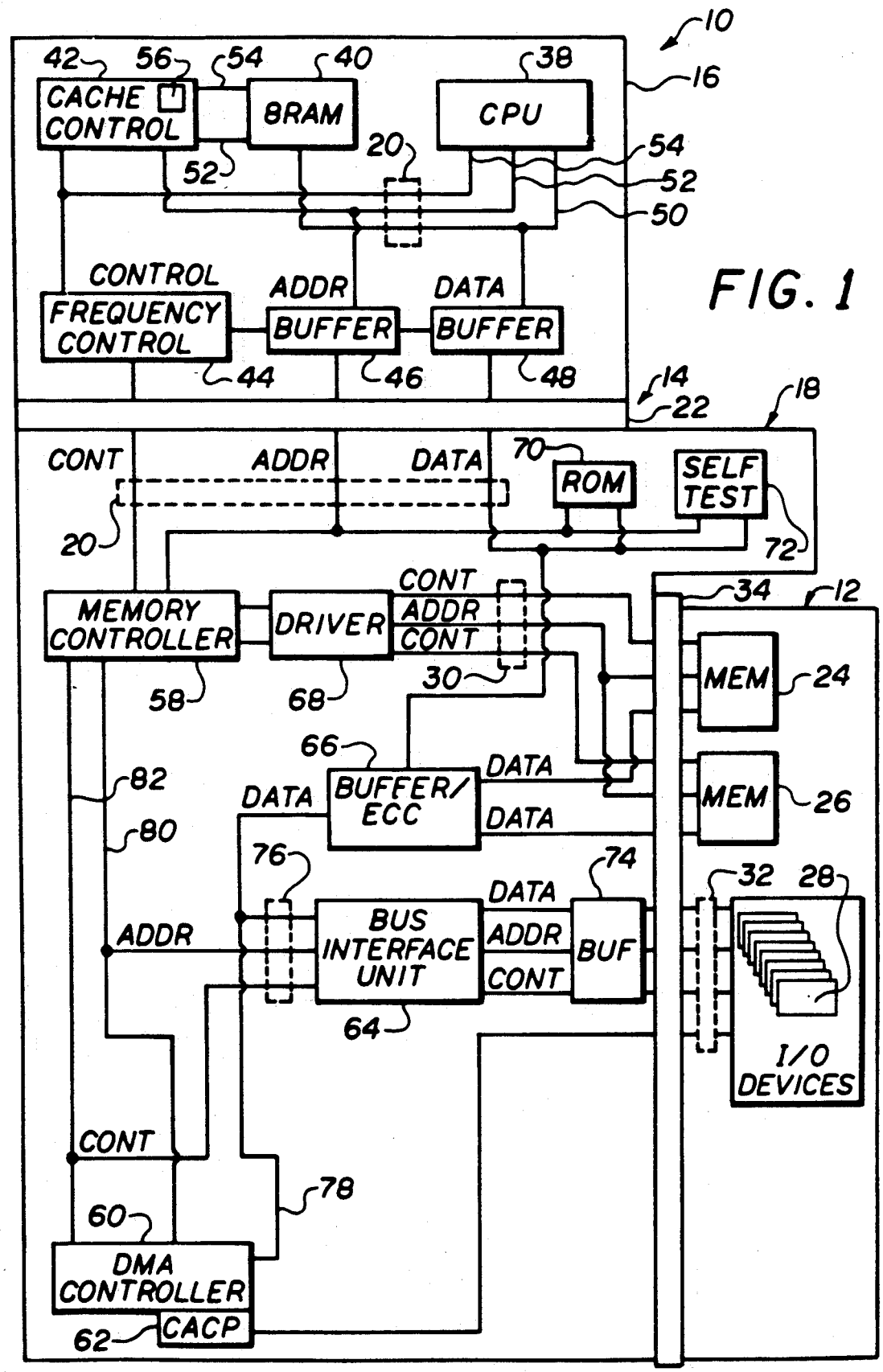
FIG. 1 is a schematic block diagram of a computer system incorporating a bus interface unit constructed according to the principles of the present invention.

Referring first to FIG. 1, a computer system shown generally at 10 comprises system board 12 and processor complex 14. Processor complex includes processor portion 16 and base portion 18 connected at processor local bus 20 via local bus connector 22. Processor portion 16 operates at 50 MHz and base portion 18 operates at 40 MHz.

System board 12 includes interleaved system memories 24 and 26 and input/output (I/O) devices 28. Communications between memories 24 and 26 and processor complex 14 are handled by memory bus 30, and communications between I/O devices 28 and processor complex 14 are carried by I/O bus 32. Communications between I/O devices and memories 24 and 26 are handled by I/O bus 32, system bus 76 and memory bus 30. I/O bus 32 may conform to MICRO CHANNEL® computer architecture. Memory bus 30 and I/O bus 32 are connected to processor complex base portion 18 via processor complex connector 34. I/O devices such as memory expansion devices may be connected to the computer system 10 via I/O bus 32. System board 12 may also include conventional video circuitry, timing circuitry, keyboard control circuitry and interrupt circuitry (none of which are shown) which may be used by computer system 10 during normal operation.

Processor portion 16 of processor complex 14 includes central processing unit (CPU) 38 which, in the preferred embodiment, is a 32-bit microprocessor available from Intel, Inc. under the trade designation i486. Processor portion 16 also includes static random access memory (SRAM) 40, cache control module 42, frequency control module 44, address buffer 46 and data buffer 48. Local bus 20 comprises data information path 50, address information path 52 and control information path 54. Data information paths 50 are provided between CPU 38, SRAM 40 and data buffer 48. Address information paths 52 are provided between CPU 38, cache control module 42 and address buffer 46. Control information paths 54 are provided between CPU 38, cache control module 42 and frequency control module 44. Additionally, address and control information paths are provided between cache control module 42 and SRAM 40.

SRAM 40 provides a cache function by storing in short term memory information from either system memories 24 or 26 or from expansion memory which is located on an I/O device 28. Cache control module 42 incorporates random access memory (RAM) 56 which stores address locations of memories 24 and 26. CPU 38 may access information cached in SRAM 40 directly over the local bus 20. Frequency control module 44 synchronizes operation of the 50 Mhz processor portion 16 with the 40 MhZ base portion 18 and also controls the operation of buffers 46 and 48. Accordingly, frequency control module 44 determines the times at which information is captured by buffers 46 and 48 or the times at which information that is stored in these buffers is overwritten. Buffers 46 and 48 are configured to allow two writes from memories 24 and 26 to be stored simultaneously therein. Buffers 46 and 48 are bi-directional, i.e., they are capable of latching information which is provided by the CPU 38 and information which is provided to the CPU. Because buffers 46 and 48 are bi-directional, processor portion 16 of the processor complex 14 may be replaced or upgraded while maintaining a standard base portion 18.

Base portion 18 includes memory controller 58, direct memory access (DMA) controller 60, central arbitration control point (CACP) circuit 62, bus interface unit 64 and buffer/error correction code (ECC) circuit 66. Base portion 18 also includes driver circuit 68, read only memory (ROM) 70, self test circuit 72 and buffer 74. System bus 76 comprises a data information path 78, and address information path 80 and a control information path 82. The data information path connects buffer 74 with bus interface unit 64; bus interface unit 64 with DMA controller 60 and buffer/ECC circuit 66; and buffer/ECC circuit 66 with system memories 24 and 26. The address information path and the control information path each connect memory controller 58 with DMA controller 60 and bus interface unit 64; and bus interface unit 64 with buffer 74.

Memory controller 58 resides on both CPU local bus 20 and system bus 76, and provides the CPU 38, the DMA controller 60 or bus interface unit 64 (on behalf of an I/O device 28) with access to system memories 24 and 26 via memory bus 30. The memory controller 58 initiates system memory cycles to system memories 24 and 26 over the memory bus 30. During a system memory cycle, either the CPU 38, the DMA controller 60 or bus interface unit 64 (on behalf of an I/O device 28) has access to system memories 24 and 26 via memory controller 58. The CPU 38 communicates to system memory via local bus 20, memory controller 58 and memory bus 30, while the DMA controller 60 or bus interface unit 64 (on behalf of an I/O device 28) access system memory via system bus 76, memory controller 58 and memory bus 30.

For CPU 38 to I/O bus 32 read or write cycles, address information is checked against system memory address boundaries. If the address information corresponds to an I/O expansion memory address or I/O port address, then memory controller 58 initiates an I/O memory cycle or I/O port cycle with an I/O device 28 (via bus interface unit 64) over the I/O bus 32. During a CPU to I/O memory cycle or I/O port cycle, the address which is provided to memory controller 58 is transmitted from system bus 76 to I/O bus 32 via bus interface unit 64 which resides intermediate these two buses. The I/O device 28 which includes the expansion memory to which the address corresponds receives the memory address from I/O bus 32. DMA controller 60 and the bus interface unit 64 control the interchange of information between system memories 24 and 26 and expansion memory which is incorporated into an I/O device 28. DMA controller 60 also provides three functions on behalf of processor complex 14. First, the DMA controller 60 utilizes a small computer subsystem control block (SCB) architecture to configure DMA channels, thus avoiding the necessity of using programmed I/O to configure the DMA channels. Second, DMA controller provides a buffering function to optimize transfers between slow memory expansion devices and the typically faster system memory. Third, DMA controller 60 provides an eight channel, 32-bit, direct system memory access function. When providing the direct system memory access function, DMA controller 60 may function in either of two modes. In a first mode, DMA controller 60 functions in a programmed I/O mode in which the DMA controller is functionally a slave to the CPU 38. In a second mode, DMA controller 60 itself functions as a system bus master, in which DMA controller 60 arbitrates for and controls I/O bus 32. During this second mode, DMA controller 60 uses a first in, first out (FIFO) register circuit.

CACP circuit 62 functions as the arbiter for the DMA controller, I/O device bus controllers and the CPU (if accessing I/O devices). CACP circuit 62 receives arbitration control signals from DMA controller 60, memory controller 58 as well as from I/O devices, and determines which devices may control the I/O bus 32 and the length of time during which the particular device will retain control of the I/O bus.

Driver circuit 68 provides control information and address information from memory controller 58 to system memories 24 and 26. Driver circuit 68 drives this information based upon the number of single in-line memory modules (SIMMs) which are used to construct system memories 24 and 26. Thus, driver circuit 68 varies the signal intensity of the control and address information which is provided to system memories 24 and 26 based upon the size of these memories.

Buffer circuit 74 provides amplification and isolation between processor complex base portion 18 and system board 12. Buffer circuit 74 utilizes buffers which permit the capture of boundary information between I/O bus 32 and bus interface unit 64 in real time. Accordingly, if computer system 10 experiences a failure condition, buffer circuit 74 may be accessed by a computer repair person to determine the information which was present at connector 34 upon failure of the system.

ROM 70 configures the system 10 upon power-up by initially placing in system memory data from expansion memory. Self test circuit 72, which is connected to a plurality of locations within base portion 18, provides a plurality of self test features. Self test circuit 72 accesses buffer circuit 74 to determine if failure conditions exist, and also tests the other major components of base portion 18 upon power-up of the system 10 to determine whether the system is ready for operation.

Figure 2:
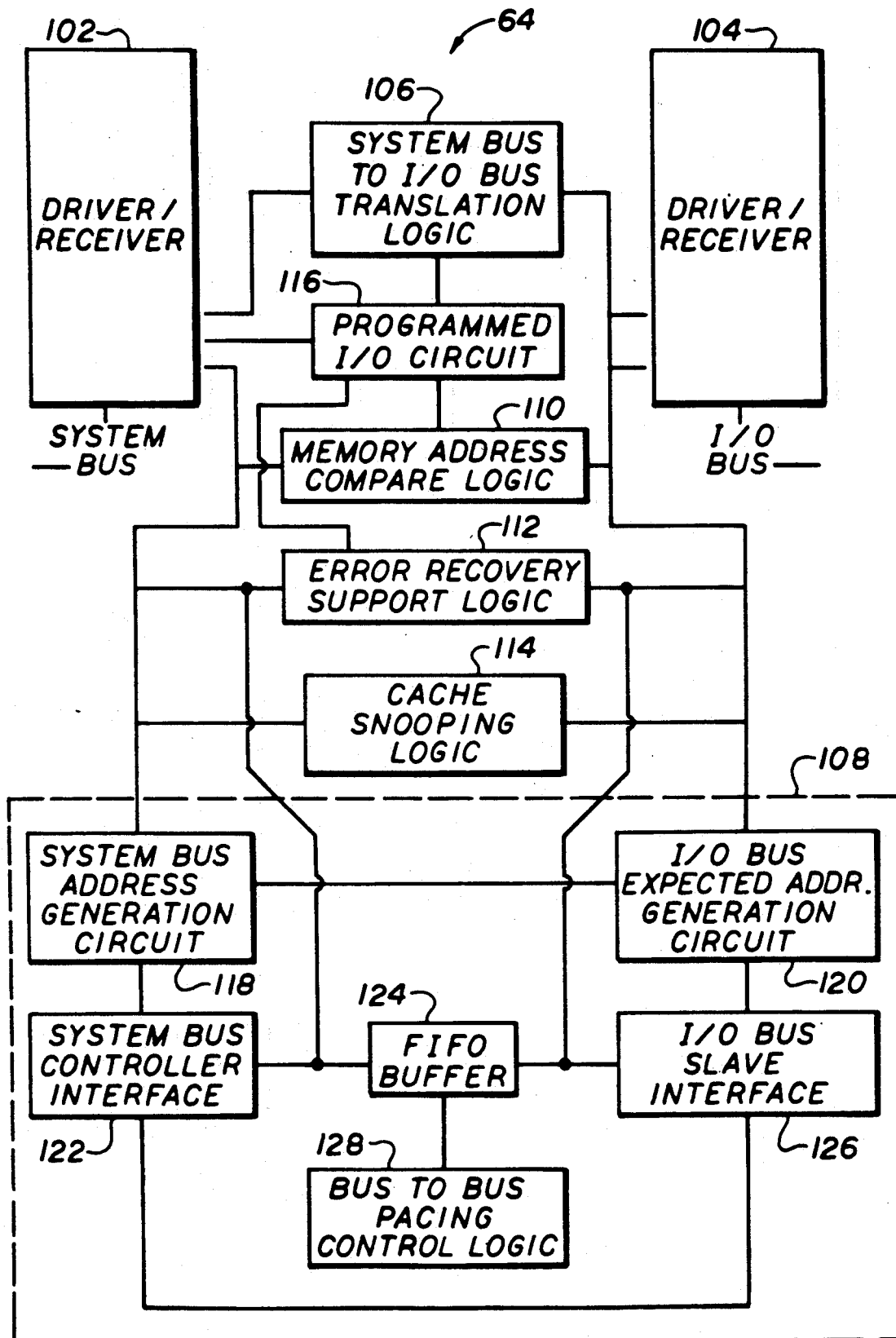
FIG. 2 is a schematic block diagram of the bus interface unit of the computer system of FIG. 1.

Referring to FIG. 2, a schematic block diagram of the bus interface unit 64 of the system of FIG. 1 is shown. Bus interface unit 64 provides the basis for implementation of the present invention by providing a bi-directional high speed interface between system bus 76 and I/O bus 32.

Bus interface unit 64 includes system bus driver/receiver circuit 102, I/O bus driver/receiver circuit 104 and control logic circuits electrically connected therebetween. Driver/receiver circuit 102 includes steering logic which directs signals received from the system bus 76 to the appropriate bus interface unit control logic circuit and receives signals from the bus interface unit control logic circuits and directs the signals to the system bus 76. I/O bus driver/receiver circuit 104 includes steering logic which directs signals received from the I/O bus 32 to the appropriate bus interface unit control logic circuit and receives signals from the bus interface unit control logic circuits and directs the signals to the I/O bus 32.

The bus interface unit control logic circuits include system bus to I/O bus translation logic 106, I/O bus to system bus translation logic 108, memory address compare logic 110, error recovery support logic 112, and cache snooping logic 114. Programmed I/O circuit 116 is also electrically coupled to system driver/receiver circuit 102.

The system bus to I/O bus translation logic 106 provides the means required for the DMA controller 60 or the memory controller 58 (on behalf of CPU 38) to act as a system bus controller to access the I/O bus 32 and thereby communicate with I/O devices 28 acting as slave devices on the I/O bus. Translation logic 106 translates the control, address and data lines of the system bus 76 into similar lines on the I/O bus 32. Most control signals and all address signals flow from the system bus 76 to the I/O bus 32 while data information flow is bi-directional. The logic which acts as system bus slave monitors the system bus 76 and detects cycles which are intended for the I/O bus 32. Upon detection of such a cycle, the system bus slave translates the timing of signals on the system bus to I/O bus timing, initiates the cycle on the I/O bus 32, waits for the cycle to be completed, and terminates the cycle on the system bus 76.

The I/O bus to system bus translation logic 108 comprises system bus address generation circuit 118, I/O bus expected address generation circuit 120, system bus controller interface 122, FIFO buffer 124, I/O bus slave interface 126 and bus to bus pacing control logic 128. System bus controller interface 122 supports a high performance 32 bit (4 byte) i486 burst protocol operating at 40 MHZ. Data transfers of four, eight and sixteen bytes in burst mode and one to four bytes in no-burst mode are provided. I/O bus slave interface 126 monitors the I/O bus 32 for operations destined for slave devices on the system bus 76 and ignores those operations destined for the I/O bus 32. All cycles picked up by the I/O bus slave interface 126 are passed on to the FIFO buffer 124 and the system bus controller interface 122.

The I/O bus to system bus translation logic 108 provides the means required for an I/O device 28 to act as an I/O bus controller to access system bus 76 and thereby read or write to system memories 24 and 26. In either of these operations, an I/O device controls the I/O bus. The asynchronous I/O bus interface 126, operating at the speed of the I/O device, permits the bus interface unit 64 to act as a slave to the I/O device controller on the I/O bus 32 to decode the memory address and determine that the read or write cycle is destined for system memories 24 or 26. Simultaneously, the system bus controller interface 122 permits the bus interface unit 64 to act as a controller on the system bus 74. The memory controller 58 (FIG. 2) acts as a slave to the bus interface unit 64, and either provides the interface 64 with data read from system memory or writes data to system memory. The reads and writes to system memory are accomplished through the FIFO buffer 124, a block diagram of which is illustrated in FIG. 3.

Figure 3:
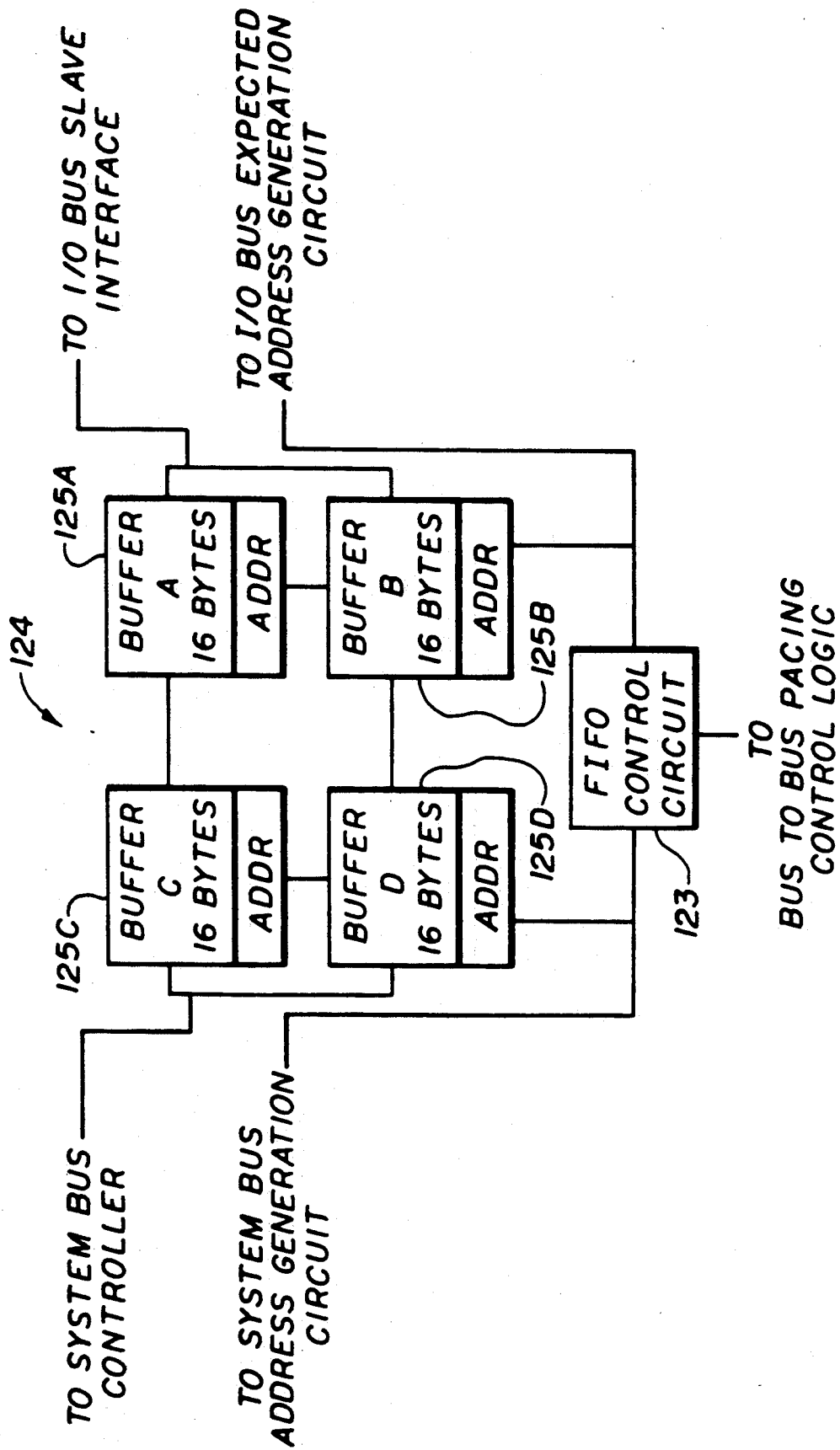
FIG. 3 is a schematic block diagram of the FIFO buffer of the bus interface unit of FIG. 2.

As shown in FIG. 3, FIFO buffer 124 is a dual ported, asynchronous, bi-directional storage unit which provides temporary storage of data information between the system and I/O buses 76, 32. FIFO buffer 124 comprises four sixteen-byte buffers 125A-125D and FIFO control circuit 123. The four buffers 125A-125D buffer data to and from I/O bus controllers and system bus slaves, thereby allowing simultaneous operation of the I/O bus 32 and the system bus 76. The FIFO buffer 124 is physically organized as two thirty-two byte buffers (125A/125B and 125C/125D). The system bus controller interface 122 and the I/O bus slave interface 126 each control one thirty-two byte buffer while the other thirty-two byte buffer operates transparent to them. Both of the thirty-two byte buffers are utilized for read and write operations.

Each FIFO 124A, 125B, 125C, 125D has an address register section either physically associated with the respective FIFO, or logically associated therewith. As data is transferred from the I/O bus 32 to FIFO 125A, the data will be accumulated until the 16 byte buffer is filled with 16 bytes of data, provided that the addresses are contiguous. If a non-contiguous address is detected by the address action, the FIFO 125A will transfer the stored data to FIFO 125C, and at the same time FIFO 125B will start to receive this data from the new non-contiguous address. FIFO 125B will continue just as FIFO 125A did until it is filled with 16 bytes of data, or another non-contiguous address is detected. FIFO 125B will then transfer the stored data to FIFO 125D, and FIFO 125A again starts to store data; thus, it is possible to store up to four 16 byte blocks of non-contiguous address data.

Further, by having two 32 byte buffers in parallel the reading and writing of data can be toggled between them thus giving an essentially continuous read or write function.

Moreover, by splitting the 32 byte buffers into two 16 bytes buffer sections which are couple to other I/O bus 32 or system bus 26, the number of storage buffers can be increased with minimal impact on the performance of the FIFO as related to the capacitive loading on signals clocking data in or out of the storage registers. This is accomplished because for every two buffers added (in parallel) only half the capacitive loading is added to the loading of clock signals on each bus.

Additionally, by having two 16 byte buffers in series in each leg, once one of the 16 byte buffers is filled with data, such as in a read operation, the data can be transferred to the other 16 byte buffers in series therewith, while the other parallel leg is accumulating data. Hence, there is no time lost in either accumulating data, or transferring the data from one bus to the other.

The logic for controlling the operation of the FIFO 124 is supplied by FIFO Control Circuit 123.

A particular I/O device 28 may write to system memories 24 or 26 via I/O bus in bandwidths of either 1, 2 or 4 bytes (i.e., 8, 16 or 32 bits). During writes to system memory by an I/O device 28, the first transfer of write data is initially stored in the FIFO buffer 125A or 125B. The I/O bus expected address generation circuit 120 calculates the next expected, or contiguous, address. The next contiguous address is checked against the subsequent I/O address to verify if the subsequent transfers are contiguous or not. If contiguous, the second byte or bytes of write data is sent to the same FIFO buffer 125A or 125B. The FIFO receives data at asynchronous speeds of up to 40 megabytes per second from the I/O bus 32.

This process continues until either buffer 125A or 125B is full with a 16-byte packet of information or a non-contiguous address is detected. On the next clock cycle, assuming that buffer 125A is full, the data in buffer 125A is transferred to buffer 125C. Similarly, when buffer 125B is full, all of its contents are transferred to buffer 125D in a single clock cycle. The data stored in the buffers 125C and 125D is then written to system memory via an i486 burst transfer at the system bus operational speed. The operation of FIFO buffer 124 during a write to system memory by an I/O device is thus continuous, alternating between buffers 125A and 125B, with each emptying into adjacent buffer 125C or 125D, respectively, while the other is receiving data to be written to system memory. The FIFO buffer 124, then, optimizes the speed of data writes to system memory by (i) anticipating the address of the next likely byte of data to be written into memory and (ii) accommodating the maximum speed of write data from the FIFO buffer to system memory via the system bus 76.

During reads of data from system memory to an I/O device 28, FIFO buffer 124 operates differently. The system bus address generation circuit 118 uses the initial read address to generate subsequent read addresses of read data and accumulate data in buffer 125C or 125D. Because the system bus supports transfers in bandwidths of 16 bytes wide, the system bus controller interface 122 may prefetch 16-byte packets of contiguous data and store it in buffers 125C or 125D without the 1/0 bus 32 actually providing subsequent addresses, thus reducing latency between transfers. When buffer 125C is full of prefetched data, it transfers its contents to buffer 125A in one clock cycle. Buffer 125D similarly empties into buffer 125B when full. The data in buffers 125A and 125B may then be read by a particular I/O device controller in bandwidths of 1, 2 or 4 bytes. In this way, system bus address generation circuit 118 functions as an increment counter until instructed to by the I/O controller device to stop prefetching data.

Bus to bus pacing control logic 128 creates a faster access to system memory for high speed I/O devices. The bus to bus pacing control logic 128 overrides the normal memory controller arbitration scheme of system 10 by allowing an I/O device in control of the I/O bus 32 uninterrupted access to system memory during transfers of data by faster devices which require multiple cycles, rather than alternating access to the memory controller 58 between the I/O device and the CPU. Thus, even if a local device such as the CPU has a pending request for control of the memory bus during a multiple cycle transmission by an I/O device, the bus to bus pacing control logic 128 will grant the I/O device continued control of the memory bus.

The programmed I/O circuit 116 is the portion of the bus interface unit 64 which contains all of the registers which are programmable within the bus interface unit 64. The registers have bits associated therewith to determine whether a particular register is active or inactive. These registers define, inter alia, the system memory and expansion memory address ranges to which the bus interface unit 64 will respond, the expansion memory addresses which are either cacheable or noncacheable, the system memory or cache address ranges, and whether or not parity or error checking is supported by the bus interface unit. Accordingly, programmed I/O circuit 116 identifies for the bus interface unit 64 the environment in which it resides, and the options to which it is configured. The registers in programmed I/O circuit 116 cannot be programmed directly over the I/O bus 32. Hence, in order to program the system 10, the user must have access to an I/O device which may communicate over the system bus to the programmed I/O circuit 116 at the CPU level.

Memory address compare logic 110 determines if a memory address corresponds to system memory or corresponds to expansion memory which is located on I/O device 28 coupled to the I/O bus 32. Because the system memory as well as the expansion memory may be in non-contiguous blocks of addresses, memory address compare logic 110 includes a plurality of comparators which are loaded with boundary information from registers in the programmed I/O circuit 116 to indicate which boundaries correspond to which memory. After a particular memory address is compared with the boundary information by the memory address compare logic, the bus interface unit is prepared to react accordingly. For example, if an I/O device controlling the I/O bus 32 is reading or writing to expansion memory, the bus interface circuit need not pass that address to the memory controller 58, thereby saving time and memory bandwidth.

Error recovery support logic 112 permits the system 10 to continue operations even if a data parity error is detected. On any read or write access by an I/O device 28 to system memories 24 or 26, parity of the data is checked. Support logic 112 interacts with a register in the programmed I/O circuit 116 for capturing the address and the time of the detected parity error. The contents of this register may then be acted upon by appropriate system software. For example, the CPU 38 may be programmed for a high level interrupt to pull the address out of the register at any time a parity error is detected. The CPU may then decide, based on the system software instructions, whether to continue system operations or merely terminate operation of the identified source of the parity error.

Cache snooping logic 114 permits the bus interface unit 64 to monitor the I/O bus 32 for any writes to expansion memory by an I/O device taking place over the I/O bus 32. The snooping logic first determines if the write to expansion memory occurred in expansion memory which is cacheable in SRAM 40. If it is not cacheable expansion memory, there is no danger of corrupt data being cached. If, however, a positive compare indicates that the write occurred in cacheable expansion memory, a cache invalidation cycle is initiated over the system bus 76. The CPU is thus instructed to invalidate the corresponding address in SRAM 40. Cache snooping logic 114 provides means to store the address of a positive compare so that snooping of the I/O bus may continue immediately after detection of the first positive compare, thereby permitting continuous monitoring of the I/O bus 32.

Figure 5:
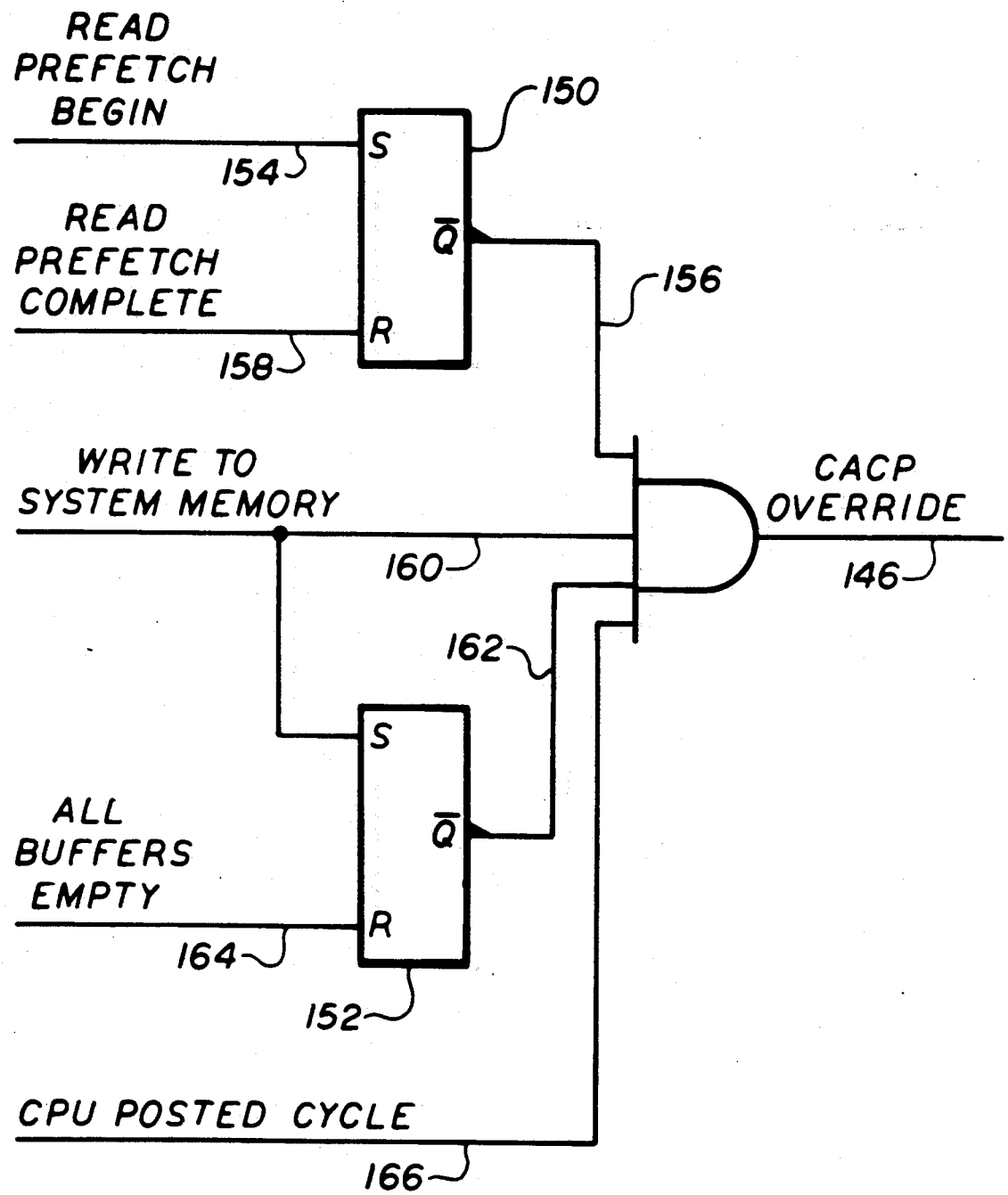
FIG. 5 is a circuit diagram of one embodiment of the arbitration control logic implemented in the bus interface unit of FIG. 1.

The present invention relates generally to the bus interface unit 64 described above and more particularly to system bus arbitration control logic 130 (FIG. 5) which is contained within the bu interface unit 64 residing intermediate the system bus 76 and the input/output bus 32 in the computer system 10. The arbitration control logic interacts with CACP circuit 62 which alternates between arbitration cycles and grant cycles. The operation of the CACP circuit 62 is described in copending U.S. patent application Ser. No. 07/777,777, filed Oct. 15, 1991, entitled "CONTROLLING BUS ALLOCATION USING ARBITRATION HOLD". The arbitration control logic 130 in the bus interface unit 64 improves the performance of the dual bus architecture computer system by permitting arbitration cycles by CACP circuit 62 to simultaneously overlap memory read and write cycles by the CPU 38 or I/O device 28.

Figure 4:
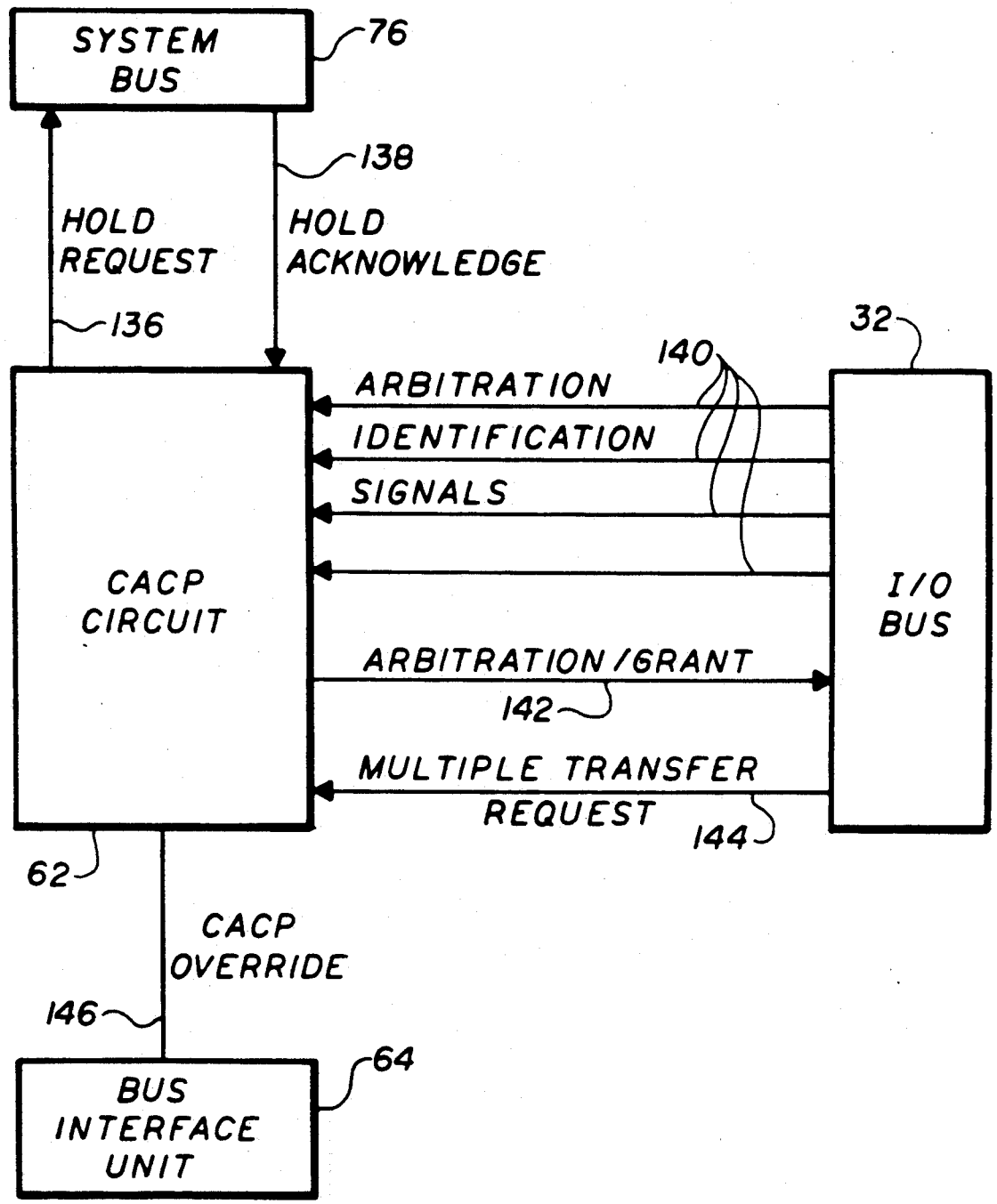
FIG. 4 is a block circuit diagram of the CACP circuit and bus interface unit of FIG. 1.

FIG. 4 shows the system interconnection of I/O bus 32, system bus 76, CACP circuit 62 and bus interface unit 64.

The multiple transfer request line 144 provides the means by which an I/O device 28 already in control of the I/O bus 32 indicates it is ready to perform more than one transfer of data over the I/O bus 32. The CACP responds to this request by maintaining I/O bus 32 in a grant mode for the I/O device until all of the multiple transfers of data have been completed over the I/O bus 32. Upon completion of the multiple transfer over the I/O bus, the I/O device deactivates line 144 and the CACP circuit 62 determines that the I/O device is off of the I/O bus 32 and begins the next arbitration cycle 132. The arbitration control logic 130 within bus interface unit 64, as will be explained below, provides a CACP override signal 146 to the bus interface unit 62 to prevent the CACP circuit from reentering grant mode while activity is occurring over the system I/O bus. Only when CACP override signal 146 is driven inactive may the CACP circuit 62 enter the next grant cycle.

The arbitration control logic 130 operates under three prescribed conditions. Under the first condition, an I/O device in control of the I/O bus 32 writes a multiple transfer of data to system memories 24 and 26 over the I/O and system buses 32, 76. Under the second condition, an I/O device in control of the I/O bus 32 reads a multiple transfer of data from system memories 24 and 26 over the I/O and system buses. Under the third condition, a system device such as the CPU 38 which is in control of the system bus 76 writes data to an I/O device acting as a slave on the I/O bus 32. In each of these three particular operations, arbitration by CACP circuit 62 is permitted to proceed before the operation has gone to completion, thereby allowing simultaneous arbitration by CACP circuit 62 on the I/O bus and completion of the particular operation.

Each of the three conditions under which the arbitration control logic 130 operates will now be explained in greater detail. Under the first condition, an I/O device 28 desires to write data to system memories 24 and 26. After completion of an arbitration cycle, CACP circuit 62 grants control of the I/O bus 32 (and the system bus 76 via the bus interface unit 64) to the I/O device 28. The I/O device initiates one or more write cycles to system memories 24 and 26 which are temporarily stored in FIFO buffers 125A and/or 125B. Since I/O device 28 may relinquish control of I/O bus 32 at any time, the bus interface unit may contain buffered data which still needs to be written from buffers 125A and/or 125B to buffers 125C and/or 125D and out to system memories 24 and 26.

Although the I/O device 28 may relinquish control of the I/O bus 32, it must remain in control of the system bus 76 (via the bus interface unit 64) to complete the write transfer of buffered data over the system bus 76 to system memories 24 and 26. The arbitration control logic 130 in the bus interface unit recognizes this condition and activates a CACP override signal 146 to CACP circuit 62 requesting that it retain control of the system bus 76 (via the bus interface unit 64). Accordingly, CACP circuit 62 begins the arbitration cycle simultaneously while the write data buffered in FIFO buffer 124 from the I/O device is transferred to system memories 24 and 26. As long as the arbitration control logic 130 continues to activate the CACP override signal 146, CACP circuit 62 will not grant access to the system bus 76 to another I/O device 28. This will occur until the last transfer of buffered write data is made to system memory. After which the arbitration control logic 130 will deactivate the CACP override signal 146 which allows the CACP 62 to complete arbitration and grant the I/O bus 32 to a new I/O device 28. This avoids contending operations on the system bus 76. I/O devices in control of the I/O bus 32 may initiate cycles on the I/O bus only when CACP circuit 62 is in grant mode.

The second condition under which the arbitration control logic 130 in the bus interface unit 64 operates occurs when an I/O device 28 desires to read data from system memories 24 and 26. After completion of an arbitration cycle, CACP circuit 62 grants control of the I/O bus 32 (and the system bus 76 via the bus interface unit 64) to the I/O device 28. The I/O device 28 initiates one or more read cycles to system memories 24 and 26. The FIFO buffers 125C and/or 125D are continually filled with prefetched contiguous data in the manner explained in the description of the FIFO buffer 124 above. Once the I/O device 28 has read the last byte of data from the FIFO buffers 125A and/or 125B it will relinquish control of I/O bus 32 and thus the data prefetched into buffers 125C and 125D is not needed. Thus, the FIFO 124 must be reset, effectively removing this unnecessary data.

Although the I/O device 28 may relinquish control of the I/O bus 32 at this time, it must remain in control of the system bus 76 (via the bus interface unit 64) until the memory controller 58 indicates that it has completed the current transfer of data from system memories 24 and 26 to the bus interface unit 64. The arbitration control logic 130 in the bus interface unit recognizes this condition and activates the CACP override signal 146 to CACP circuit 62 requesting that it retain control of the system bus 76 (via the bus interface unit 64) until the last prefetch operation is completed and the FIFO buffer 124 is reset. Accordingly, CACP circuit 62 begins a new arbitration cycle on the I/O bus 32 simultaneously while the bus interface unit 64 completes the last prefetch operation from system memory over the system bus 76 and then resets the FIFO buffer 124. As long as the arbitration control logic 130 continues to activate the CACP override signal 146, CACP circuit 62 will not grant access to the system bus 76 to another I/O device 28. This will occur until the prefetch and reset operations are completed over the system bus after which the arbitration control logic 130 will deactivate the CACP override signal 146 which allows the CACP 62 to complete arbitration and grant the I/O bus 32 to a new I/O device 28. This avoids contending operations on the system bus 76.

The third condition under which the arbitration control logic 130 in the bus interface unit operates occurs when a system device such as the CPU 38 in control of the system bus 76 and desires to write data to an I/O device 28 acting as a slave on the I/O bus 32. After completion of an arbitration cycle, CACP circuit 62 grants control of the system bus 76 (and the I/O bus 32 via the bus interface unit 64) to the system device which initiates its write cycle to the I/O device 28 via the system bus to I/O bus translation logic 106.

The system bus to I/O bus translation logic 106 provides a buffer (not shown) wherein data destined to be written from a system device such as the CPU 38 to expansion memory on an I/O slave device is temporarily stored before being written to the I/O slave device. After the last transfer of data is buffered in translation logic 106, the system bus 76 is no longer needed. The CPU 38 indicates that it is finished with the system bus 76 as does the bus interface unit 64, however, the arbitration control logic 130 will activate the CACP override signal 146 to inform the CACP 62 that it needs to retain control of I/O bus 32. At this point, CACP circuit 62 may go into arbitration on the I/O bus 32 even though the buffered data in translation logic 106 must still be written to the I/O device over the I/O bus 32. This situation is possible because, unlike I/O devices, the CPU 38 may write to an I/O device during either the arbitration or grant modes of CACP circuit 62.

Accordingly, CACP circuit 62 conducts the arbitration cycle simultaneously while the buffered data in translation logic 106 is written to the I/O device, after which the arbitration control logic 130 will deactivate the CACP override signal 146 which allows the CACP 62 to complete arbitration and grant the I/O bus 32 to a new I/O device 28. This avoids contending operations on the I/O bus between the CPU 38 and an I/O device 28.

One embodiment of the arbitration control logic 130 within the bus interface unit 64 is shown in FIG. 6. The arbitration control logic 130 is implemented by algorithms which are built into the hardware of the bus interface unit 64. Arbitration control logic 130 comprises AND gate 148 and S-R latches 150 and 152. As explained above, the CACP override signal 146 is output by the arbitration control logic 130 when an I/O device in control of the I/O bus 32 reads or writes a multiple transfer of data from or to system memories 24 and 26 over the I/O and system buses 32, 76. CACP override signal 146 is negative active. Hence, during an I/O device read from system memories 24 and 26, data is prefetched from system memory into FIFO buffer 124 and read prefetch begin line 154 is driven HIGH, setting latch 150. The complemented output 156 of latch 150 goes LOW, activating the CACP override signal 146, and preventing the CACP circuit 62 from performing its next grant cycle while data is prefetched over the system bus 76. The I/O device retains control of the system bus (via the bus interface unit 64) until the read prefetch operation is complete. When the read prefetch operation is complete, line 158 is driven HIGH, resetting latch 150 and deactivating the CACP override signal 146. The CACP circuit 62, which by now has entered the arbitration mode, is permitted to enter the next grant mode.

During an I/O device write to system memories 24 and 26, data is first written into FIFO buffer 124 and the write to system memory line 160 is driven HIGH, thereby setting latch 152. The complemented output 162 of latch 152 goes LOW, activating the CACP override signal 146, and preventing the CACP circuit 62 from entering its next grant cycle while data is being written from FIFO buffer 124 to system memory over the system bus 76. The I/O device retains control of the system bus (via the bus interface unit 64) until the write to system memory is complete. The I/O bus, however, is available for simultaneous arbitration processes by the CACP circuit 62. CACP override signal 146 prevents the CACP circuit from re-entering the grant mode. Upon completion of the write operation, all of the buffers in FIFO buffer 124 will be empty, driving line 164 HIGH and resetting latch 152. CACP override signal 146 will be deactivated, enabling the CACP circuit 62 to enter grant mode.

During a system device (such as the CPU 38), write to an I/O device 28, the data is temporarily stored in a buffer provided by I/O bus translation logic 106. Upon storing the data, I/O bus translation logic 106 will drive the posted CPU cycle signal 166 low, activating the CACP override signal 146, as well as informing system bus 76 that the write cycle has been completed. This allows additional operations to occur on system bus 76 while I/O bus translation logic 106 completes writing the buffered data to I/O device 28. Upon completing the write operation to I/O device 28, I/O bus translation logic 106 will drive the CPU posted cycle signal 166 HIGH, thereby deactivating the CACP override signal 146, which allows CACP 62 to complete arbitration and grant I/O bus 32 to a new I/O device 28.

Accordingly, the preferred embodiment of a bus control logic system for computers having dual bus architecture has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. A computer system, comprising:
   system memory and a memory controller for controlling access thereto, said system memory and said memory controller connected by a memory bus;
   a central processing unit electrically connected with said memory controller;
   a bus interface unit electrically connected to said memory controller by a system bus and electrically connected to a plurality of input/output devices by an input/output bus, said input/output devices able to initiate read or write operations to and from said system memory over said input/output bus, said bus interface unit and said system bus, said bus interface unit including a buffer circuit wherein read or write data transferred between said system bus and said input/output bus over said bus interface unit during said read or write operations is temporarily stored during the transfer;
   a central arbitration control point residing on said system bus for serially performing (i) arbitration cycles wherein said central arbitration control point arbitrates, between input/output devices having requests pending for access to said input/output bus, to determine which of said input/output devices should be granted control of said input/output bus and (ii) grant cycles wherein said central arbitration control point grants control of said input/output bus and extends control of said system bus to one of said input/output devices; and
   bus arbitration control logic included in said bus interface unit which is responsive to a predetermined set of operating conditions to permit simultaneous occurrence of (i) arbitration cycles by said central arbitration control point and (ii) completion of data transfer between said buffer circuit and said system memory over said system bus during completion of said read or write operation.

2. The computer system of claim 1, wherein said arbitration control logic comprises one or more algorithms which are implemented as hardware in said bus interface unit.

3. The computer system of claim 1, wherein one of said predetermined set of operating conditions occurs when said one of said input/output devices reads data from said system memory over said input/output bus and said system bus.

4. The computer system of claim 3, wherein said buffer circuit includes at least two pairs of sixteen byte buffers, both of said buffers being used for both read and write operations.

5. The computer system of claim 1, wherein one of said predetermined set of operating conditions occurs when said one of said input/output devices writes data to said system memory over said input/output bus and said system bus.

6. The computer system of claim 5, wherein said buffer circuit includes at least two pairs of sixteen byte buffers, both of said buffers being used for both read and write operations.

7. The computer system of claim 1, wherein said buffer circuit includes a dual ported, asynchronous, bi-directional storage unit.

8. The computer system of claim 1, wherein said system bus supports burst transfers of read or write data between said bus interface unit and said system memory in bandwidths of up to sixteen bytes, and wherein said input/output bus supports transfers of read or write data between said input/output device and said bus interface unit in bandwidths of up to four bytes.

9. A method of arbitrating between input/output devices residing on an input/output bus for control of said input/output bus in a computer system, said system further comprising system memory and a memory controller connected by a memory bus, and a bus interface unit connected at one end to said input/output bus and at the other end to said memory controller by a system bus, said method of arbitration comprising the steps of:
performing an arbitration cycle with a central arbitration control point residing on said system bus wherein said central arbitration control point arbitrates between input/output devices requesting access to said input/output bus to determine which of said input/output devices should be granted control of said input/output bus;
performing a grant cycle wherein said central arbitration control point grants control of said input/output bus and extends control of said system bus to one of said input/output devices;
initiating a read or write operation with said one of said input/output devices to said system memory over said input/output bus, said bus interface unit, and said memory bus;
temporarily storing in a buffer circuit in said bus interface unit read or write data transferred between said system bus and said input/output bus over said bus interface unit; and
performing a subsequent arbitration cycle simultaneously with the completion of data transfer between said buffer circuit and said system memory over said system bus to complete said read or write operation, in response to a predetermined set of operating conditions.

10. The method of claim 9, wherein said system bus transfers read or write data between said bus interface unit and said system memory in bandwidths of up to sixteen bytes, and wherein said input/output bus transfers read or write data between said input/output device and said bus interface unit in bandwidths of up to four bytes.

11. The method of claim 9, wherein said bus interface unit incorporates a dual ported, asynchronous, bi-directional storage unit.

12. The method of claim 11, wherein said storage unit includes at least two pairs of sixteen byte buffers, both of said pairs of buffers being used for both read and write operations.

13. The method of claim 11, wherein one of said predetermined series of operating conditions occurs when said one of said input/output devices reads data from system memory over said input/output bus and said system bus.

14. The method of claim 11, wherein one of said predetermined series of operating conditions occurs when said one of said input/output devices writes data to said system memory over said input/output bus and said system bus.

15. A computer system, comprising:
system memory and a memory controller for controlling access thereto, said system memory and said memory controller connected by a memory bus;
a system device electrically connected with said memory controller;
a bus interface unit electrically connected to a plurality of input/output devices by an input/output bus and to said memory controller by a system bus, said system device able to initiate write operations to said input/output devices over said system bus, said bus interface unit and said input/output bus, said bus interface unit including a buffer circuit wherein write data transferred between said system bus and said input/output bus over said bus interface unit during said write operation is temporarily stored during the transfer;
a central arbitration control point residing on said system bus for serially performing (i) arbitration cycles wherein said central arbitration control point arbitrates between said input/output devices having requests pending for access to said input/output bus to determine which of said input/output devices should be granted control of said input/output bus and (ii) grant cycles wherein said central arbitration control point grants control of said input/output bus and extends control of said system bus to one of said input/output devices; and
bus arbitration control logic included in said bus interface unit which permits simultaneous occurrence of (i) arbitration cycles by said central arbitration control point and (ii) completion of data transfer between said buffer circuit and said input/output device over said input/output bus during completion of said write operation.

16. The system of claim 15, wherein said system device is a central processing unit.

17. The system of claim 15, wherein said system device is a direct memory access controller.

18. The system of claim 15, wherein said arbitration control logic comprise one or more algorithms which are implemented as hardware in said bus interface unit.

19. The system of claim 18, wherein said buffer circuit includes a dual ported, asynchronous, bi-directional storage unit.

20. A method of arbitrating between input/output devices residing on an input/output bus for control of said input/output bus in a computer system, said system further comprising system memory and a memory controller connected by a memory bus, and a bus interface unit connected at one end to said input/output bus and at the other end to said memory controller by a system bus, said method of arbitration comprising the steps of:
- performing an arbitration cycle with a central arbitration control point residing on said system bus wherein said central arbitration control point arbitrates between input/output devices requesting access to said input/output bus to determine which of said input/output devices should be granted control of said input/output bus;
- performing a grant cycle wherein said central arbitration control point grants control of said input/output bus and extends control of said system bus to an input/output device;
- initiating a write operation with a system device attached to said system bus to one of said input/output devices over said memory bus, said bus interface unit, and said input/output bus;
- temporarily storing in a buffer circuit in said bus interface unit write data transferred between said system bus and said input/output bus over said bus interface unit; and
- performing a subsequent arbitration cycle simultaneously with the completion of data transfer between said buffer circuit and said one of said input/output devices over said input/output bus to complete said read or write operation.

21. The method of claim 20, wherein said system device is a central processing unit.

22. The method of claim 20, wherein said system device is a direct memory access controller.

23. The method of claim 20, wherein said arbitration control logic comprise one or more algorithms which are implemented as hardware in said bus interface unit.

24. The method of claim 23, wherein said buffer circuit includes a dual ported, asynchronous, bi-directional storage unit.

25. An arbitration mechanism for arbitrating between input/output devices residing on an input/output bus for control of said input/output bus in a dual bus computer system, said system further comprising system memory and a memory controller connected by a memory bus, and a bus interface unit connected at one end to said input/output bus and at the other end to said memory controller by a system bus, said arbitration mechanism comprising:
- a central arbitration control point residing on said system bus for serially performing (i) arbitration cycles wherein said central arbitration control point arbitrates between input/output devices having requests pending for access to said input/output bus to determine which of said input/output devices should be granted control of said input/output bus and (ii) grant cycles wherein said central arbitration control point grants control of said input/output bus and extends control of said system bus to one of said input/output devices;
- a bus interface unit electrically connected to said memory controller by said system bus and electrically connected to said input/output devices by said input/output bus, said input/output devices able to initiate read or write operations to and from said system memory over said input/output bus, said bus interface unit and said system bus, said bus interface unit including a buffer circuit wherein read or write data transferred between said system bus and said input/output bus over said bus interface unit during said read or write operations is temporarily stored during the transfer; and
- bus arbitration control logic included in said bus interface unit which permits simultaneous occurrence of (i) arbitration cycles by said central arbitration control point and (ii) completion of data transfer between said buffer circuit and said system memory over said system bus during completion of one of said read or write operations.

26. An arbitration mechanism for arbitrating between input/output devices residing on an input/output bus for control of said input/output bus in a dual bus computer system, said system further comprising system memory and a memory controller connected by a memory bus, a bus interface unit connected at one end to said input/output bus and at the other end to said memory controller by a system bus, and a system device attached to said system bus, said arbitration mechanism comprising:
- a central arbitration control point residing on said system bus for serially performing (i) arbitration cycles wherein said central arbitration control point arbitrates between input/output devices having requests pending for access to said input/output bus to determine which of said input/output devices should be granted control of said input/output bus and (ii) grant cycles wherein said central arbitration control point grants control of said input/output bus and extends control of said system bus to one of said input/output devices;
- a bus interface unit electrically connected to a plurality of input/output devices by an input/output bus and to said memory controller said system bus, said system device able to initiate write operations to said input/output devices over said system bus, said bus interface unit and said input/output bus, said bus interface unit including a buffer circuit wherein write data transferred between said system bus and said input/output bus over said bus interface unit during said write operation is temporarily stored during the transfer; and
- bus arbitration control logic included in said bus interface unit which permits simultaneous occurrence of (i) arbitration cycles by said central arbitration control point and (ii) completion of data transfer between said buffer circuit and said input/output device over said input/output bus during completion of said write operation.

* * * * *